(12) United States Patent
Nakagawa

(10) Patent No.: US 8,918,297 B2
(45) Date of Patent: Dec. 23, 2014

(54) ELECTRONIC DEVICE INTEGRITY MONITORING APPARATUS

(75) Inventor: Shingo Nakagawa, Gifu (JP)

(73) Assignee: NABTESCO Corporation, Tokyo (JP)

( * ) Notice: Subject to any disclaimer, the term of this patent is extended or adjusted under 35 U.S.C. 154(b) by 463 days.

(21) Appl. No.: 13/398,762

(22) Filed: Feb. 16, 2012

(65) Prior Publication Data

US 2012/0221262 A1 Aug. 30, 2012

(30) Foreign Application Priority Data

Feb. 25, 2011 (JP) ................................. 2011-039530

(51) Int. Cl.
  *G01R 31/00* (2006.01)
  *B64C 13/50* (2006.01)
  *G05B 23/02* (2006.01)
  *G06F 11/30* (2006.01)
  *B64D 45/00* (2006.01)

(52) U.S. Cl.
  CPC .... *G05B 23/0237* (2013.01); *B64D 2045/0085* (2013.01); *B64C 13/50* (2013.01)
  USPC .................. 702/58; 702/59; 702/60; 702/182

(58) Field of Classification Search
  CPC .......................... G01R 31/2834; G06F 11/008
  USPC ...................... 702/58–60, 182–189
  See application file for complete search history.

(56) References Cited

U.S. PATENT DOCUMENTS

| | | | |
|---|---|---|---|
| 4,355,298 A | 10/1982 | Jessup | |
| 5,334,826 A | 8/1994 | Sato et al. | |
| 6,023,222 A * | 2/2000 | Brossmer et al. | 340/511 |
| 2005/0278147 A1* | 12/2005 | Morton et al. | 702/183 |

FOREIGN PATENT DOCUMENTS

| | | |
|---|---|---|
| JP | 2000-347707 A | 12/2000 |
| JP | 2006-240612 A | 9/2006 |
| JP | 2006-323551 A | 11/2006 |
| JP | 2008-505004 A | 2/2008 |
| WO | 2006/012266 A1 | 2/2006 |

OTHER PUBLICATIONS

The extended European search report issued on Jan. 7, 2014, which corresponds to European Patent Application No. 12155006.5-1802 is related to U.S. Appl. No. 13/398,762.
An Office Action; "Notice of Reasons for Rejection," issued by the Japanese Patent Office on Aug. 6, 2014, which corresponds to Japanese Patent Application No. 2011-039530 and is related to U.S. Appl. No. 13/398,762; with English language partial translation.

* cited by examiner

*Primary Examiner* — Phuong Huynh
(74) *Attorney, Agent, or Firm* — Studebaker & Brackett PC

(57) ABSTRACT

A storage unit stores a first reference value of an input/output electric signal into/from control unit and a second reference value of an input/output electric signal into/from a monitoring unit. If the amount of deviation between the input/output electric signal into/from the control unit and the first reference value exceeds a threshold value, a first caution signal output unit detects degradation of the control unit and outputs a caution signal. If the amount of deviation between the input/output electric signal into/from the monitoring unit and the second reference value exceeds a threshold value, a second caution signal output unit detects degradation of the monitoring unit and outputs a caution signal. The first and second reference values are acquired and stored in the storage unit in a period between completion of production of the control unit and the monitoring unit and start of the operation thereof.

5 Claims, 4 Drawing Sheets

ELECTRONIC DEVICE INTEGRITY MONITORING APPARATUS

CROSS-REFERENCE TO RELATED APPLICATIONS

This application claims priority to Japanese Patent Application No. 2011-039530. The entire disclosure of Japanese Patent Application No. 2011-039530 is hereby incorporated herein by reference.

BACKGROUND OF THE INVENTION

1. Field of the Invention

The present invention relates to an electronic device integrity monitoring apparatus for monitoring the integrity of an electronic device that outputs a control signal to an operating device whose operation is to be controlled.

2. Description of Related Art

As an apparatus for detecting a failure in an electronic device that outputs a control signal to an actuator serving as an operating device whose operation is to be controlled, JP 2006-240612A discloses an ACE (Actuator Control Electronics) provided in an actuator control apparatus.

The actuator control apparatus disclosed in JP 2006-240612A is configured as an apparatus that controls the operation of a control surface of an aircraft. Also, the actuator control apparatus is provided with an FCC (Flight Control Computer) and the above-described ACE. The FCC is configured as a device that generates an instruction signal for controlling the operation of a control surface. The ACE is configured as an electronic device that outputs a control signal for controlling the actuator for driving the control surface based on the above-described instruction signal.

The ACE of the actuator control apparatus disclosed in JP 2006-240612A is provided with a control unit (31) serving as a digital arithmetic portion that generates an instruction signal for controlling the operation of the actuator based on an instruction signal for commanding the operation of the control surface that is generated by the FCC. This ACE is further provided with a monitoring unit (41) serving as a digital arithmetic portion that monitors an abnormality relating to the operation of the ACE. This monitoring unit is configured to perform the same process as the above-described control unit. This provides a configuration that enables monitoring of the occurrence of a generic failure, that is, a failure that may occur commonly among the same pieces of software or hardware.

JP 2008-505004A discloses a system for managing the structural integrity of a mobile platform of an aircraft or the like although this system is not an electronic device integrity monitoring apparatus for monitoring the integrity of an electronic device that outputs a control signal to an operating device whose operation is to be controlled. In JP 2008-505004A, an aircraft is disclosed as a mobile platform whose structural integrity is monitored by the system, and a fuselage, a pair of wings, a vertical stabilizer, and a pair of horizontal stabilizers are disclosed as structural elements that are monitored by the system.

SUMMARY OF THE INVENTION

As described previously, the ACE of the actuator control apparatus disclosed in JP 2006-240612A is provided as an electronic device that outputs a control signal to the actuator. Also, the ACE includes a control unit that generates a control signal and a monitoring unit that performs the same process as the control unit, and is configured to detect a generic failure by comparing signals generated by the control unit and the monitoring unit.

As such, the ACE disclosed in JP 2006-240612A can detect a generic failure, but cannot detect the degree of degradation of each of the control unit and the monitoring unit, or in other words, the susceptibility to a failure of the ACE serving as an electronic device. On the other hand, if it is possible to detect the degree of degradation of each of the control unit and the monitoring unit, then it is possible to perform maintenance such as replacement of the device and components at an appropriate timing before a failure occurs in the control unit or the monitoring unit. Accordingly, it is possible to suppress the occurrence of a failure of the electronic device from impeding efficient operation of an operating device to which a control signal is output from the electronic device.

In addition, the structural integrity management system for a mobile platform disclosed in JP 2008-505004A is a system in which the integrity of structural elements of an aircraft, such as a fuselage, is monitored, and cannot monitor the integrity of an electronic device that outputs a control signal to an operating device whose operation is to be controlled.

In view of the foregoing circumstances, it is an object of the present invention to provide an electronic device integrity monitoring apparatus capable of monitoring the integrity of an electronic device that outputs a control signal to an operating device whose operation is to be controlled, monitoring a generic failure by being provided with a control unit and a monitoring unit, and even detecting the degree of degradation of the control unit and the monitoring unit.

According to a first aspect of an electronic device integrity monitoring apparatus for achieving the above-described object, there is provided an electronic device integrity monitoring apparatus for monitoring the integrity of an electronic device that outputs a control signal to an operating device whose operation is to be controlled, the apparatus including: a control unit with which the electronic device is provided and that generates the control signal for controlling operation of the operating device; a monitoring unit with which the electronic device is provided and that monitors a state of the control unit by performing the same calculation as that performed by the control unit; a storage unit that stores a first reference value serving as a reference value of a voltage value or a current value of an input/output electric signal that is input into or output from the control unit and a second reference value serving as a reference value of a voltage value or a current value of an input/output electric signal that is input into or output from the monitoring unit; a first caution signal output unit that compares the input/output electric signal into/from the control unit with the first reference value stored in the storage unit, calculating an amount of deviation therebetween, and that outputs, if the amount of deviation exceeds a predetermined first threshold value, a first caution signal for signaling that degradation of the control unit has been detected; and a second caution signal output unit that compares the input/output electric signal into/from the monitoring unit with the second reference value stored in the storage unit, calculating an amount of deviation therebetween, and that outputs, if the amount of deviation exceeds a predetermined second threshold value, a second caution signal for signaling that degradation of the monitoring unit has been detected, wherein the first reference value and the second reference value are acquired and stored in the storage unit in a period between completion of production of the control unit and the monitoring unit and start of operation thereof, and the first caution signal output unit and the second caution signal output unit acquire the input/output electric signals into/from the control unit and the monitoring unit, respectively, under the same conditions as those under which the first reference value and the second reference value are acquired.

With this configuration, an abnormality relating to the operation of the electronic device with regard to the processing performed by the control unit is monitored by the monitoring unit, and therefore a configuration that monitors a generic failure can be achieved. As for the control unit, the first caution signal output unit calculates the amount of deviation between the first reference value, which is the reference value of the input/output electric signal acquired and stored in a period between completion of production of the control unit and start of operation thereof, and the input/output electric signal acquired under the same conditions as those used for acquisition of the first reference value. As the degradation of the performance of the control unit from the initial state progresses, the amount of deviation increases. Furthermore, if the above-described amount of deviation exceeds a predetermined threshold value, or in other words, if the degree of degradation progresses to a degree greater than a predetermined degree, the first caution signal output unit detects degradation and outputs a caution signal. Accordingly, with the integrity monitoring apparatus, the degree of degradation of the control unit is detected, or in other words, the susceptibility to a failure of the control unit is determined quantitatively and then signaled.

As for the monitoring unit, the second caution signal output unit calculates the amount of deviation between the second reference value, which is the reference value of the input/output electric signal acquired and stored in a period between completion of production of the monitoring unit and start of operation thereof, and the input/output electric signal acquired under the same conditions as those used for acquisition of the second reference value. As the degradation of the performance of the monitoring unit from the initial state progresses, the amount of deviation increases. Furthermore, if the above-described amount of deviation exceeds a predetermined threshold value, or in other words, if the degree of degradation progresses to a degree greater than a predetermined degree, the second caution signal output unit detects degradation and outputs a caution signal. Accordingly, with the integrity monitoring apparatus, the degree of degradation of the monitoring unit is detected, or in other words, the susceptibility to a failure of the monitoring unit is determined quantitatively and then signaled.

As described above, with the integrity monitoring apparatus, the degree of degradation of each of the control unit and the monitoring unit is detected, and it is possible to perform maintenance such as replacement of the device and components at an appropriate timing before a failure occurs in the control unit or the monitoring unit. Accordingly, it is possible to suppress the occurrence of a failure of the electronic device from impeding efficient operation of the operating device to which a control signal is output from the electronic device. Thus, the integrity monitoring apparatus having the above-described configuration can monitor the integrity of the electronic device that outputs a control signal to the operating device whose operation is to be controlled.

Therefore, with the above-described configuration, it is possible to provide an electronic device integrity monitoring apparatus capable of monitoring the integrity of the electronic device that outputs a control signal to an operating device whose operation is to be controlled, monitoring a generic failure by being provided with the control unit and the monitoring unit, and even detecting the degree of degradation of the control unit and the monitoring unit.

According to an electronic device integrity monitoring apparatus of a second aspect of the present invention, in the electronic device integrity monitoring apparatus of the first aspect, each of the first threshold value and the second threshold value is set across a plurality of levels, a plurality of types of the first caution signals respectively corresponding to the plurality of first threshold values are output, and a plurality of types of the second caution signals respectively corresponding to the plurality of second threshold values are output.

With this configuration, each of the first and the second threshold values is set across a plurality of levels and a plurality of types of the first and second caution signals respectively corresponding to the levels are output, and therefore, the degree of degradation of each of the control unit and the monitoring unit is detected in a step-wise manner across a plurality of stages and then signaled. Accordingly, it is possible to take different countermeasures in a step-wise manner during maintenance, depending on the level of the caution signal, thus taking more appropriate countermeasures in a step-wise manner according to the status of degradation.

According to an electronic device integrity monitoring apparatus of a third aspect of the present invention, in the electronic device integrity monitoring apparatus of the first aspect, the control unit and the first caution signal output unit are configured in the same processor, and the monitoring unit and the second caution signal output unit are configured in the same processor.

With this configuration, the control unit and the first caution signal output unit are configured in the same processor, and the monitoring unit and the second caution signal output unit are configured in the same processor. Accordingly, the processor that realizes the function of the control unit can be effectively used to handle the function of the first caution signal output unit as well, and the processor that realizes the function of the monitoring unit can be effectively used to handle the function of the second caution signal output unit as well. This can realize simplification and streamlining of the overall configuration of the integrity monitoring apparatus.

According to an electronic device integrity monitoring apparatus of a fourth aspect of the present invention, in the electronic device integrity monitoring apparatus of the first aspect, the first caution signal output unit, the second caution signal output unit, and at least one of the control unit and the monitoring unit are configured in the same processor.

With this configuration, the first and second caution signal output units, and one of the control unit and the monitoring unit are configured in the same processor. Accordingly, the processor that realizes the function of the control unit or the monitoring unit can be effectively used to handle the functions of the first and second caution signal output units as well. This can realize simplification and streamlining of the overall configuration of the integrity monitoring apparatus.

According to an electronic device integrity monitoring apparatus of a fifth aspect of the present invention, the electronic device integrity monitoring apparatus of the first aspect further includes a superordinate controller that outputs a command signal to the electronic device that is provided with the control unit and the monitoring unit, wherein the controller is provided with the storage unit, the first caution signal output unit, and the second caution signal output unit.

With this configuration, the superordinate controller, which outputs a command signal to the electronic device with which the control unit and the monitoring unit are provided, is provided with the storage unit, and the first and second caution signal output units. Accordingly, the superordinate controller can be effectively used to handle the function of the storage unit, and the functions of the first and second caution signal output units. This can realize simplification and streamlining of the overall configuration of the integrity monitoring apparatus that includes the electronic device and the superordinate controller.

It should be appreciated that the above and other objects, and features and advantages of the present invention will become apparent from the following description taken in conjunction with the accompanying drawings.

DETAILED DESCRIPTION OF THE INVENTION

Hereinafter, embodiments for carrying out the present invention will be described with reference to the accompanying drawings. The embodiments of the present invention are widely applicable as an electronic device integrity monitoring apparatus for monitoring the integrity of an electronic device that outputs a control signal to an operating device whose operation is to be controlled.

First Embodiment

Figure 1:
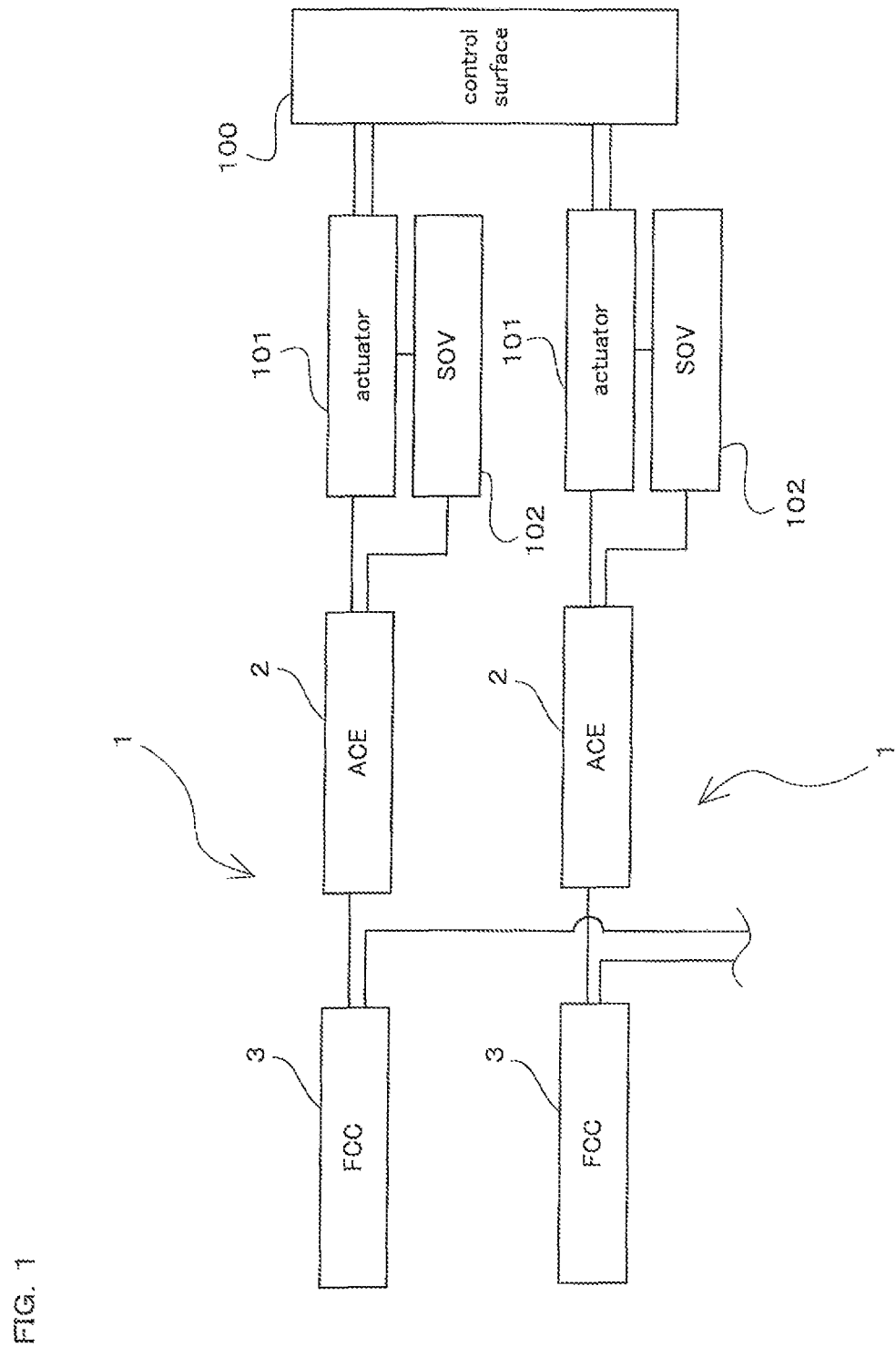
FIG. 1 is a block diagram schematically showing an actuator control system to which an electronic device integrity monitoring apparatus according to a first embodiment of the present invention is applied.

FIG. 1 is a block diagram schematically showing an actuator control system 1 to which an electronic device integrity monitoring apparatus 2 according to a first embodiment of the present invention is applied. The actuator control system 1 shown in FIG. 1 is mounted to an aircraft (not shown), and is provided as a flight control system serving as an FBW (Fly By Wire) system that controls the operation of a control surface 100 of the aircraft via electric signals.

Examples of aircraft moving surfaces (flight control surfaces) constituting the control surface 100 whose operation is controlled by the actuator control system 1 include an aileron, a rudder, and an elevator. The control surface 100 is driven by a plurality of actuators (101, 101), and each of the actuators 101 is provided, for example, as a mechanism including a hydraulic cylinder.

Also, the actuators (101, 101) are configured to operate under the control of their respective ACEs 2, which will be described below. Further, the actuators (101, 101) are also configured to follow the motion of the control surface 100 (so as to be slaved to the control surface 100) by solenoid valves (102, 102) being respectively driven by the ACEs 2. The solenoid valves (hereinafter, referred to as "SOVs") 102 are provided respectively corresponding to the actuators 101.

In this embodiment, the ACE 2 constitutes an electronic device embodiment that outputs a control signal to the actuator 101 serving as an operating device whose operation is to be controlled. Also, the ACE 2 is provided with the function for monitoring the integrity of the ACE 2 serving as the electronic device in this embodiment. That is, the ACE 2 also constitutes the electronic device integrity monitoring apparatus 2 in this embodiment. In the following description, the ACE 2 is also referred to as an "electronic device 2" or an "integrity monitoring apparatus 2".

Note that the configuration of the operating device whose operation is to be controlled to which the integrity monitoring apparatus 2 is applied is not limited to a configuration in which an operating device is configured as the actuator 101 for driving the control surface 100. That is, the integrity monitoring apparatus 2 may be applied to operating devices having various configurations.

As shown in FIG. 1, the actuator control system 1 is provided corresponding to each of the actuators 101 in the aircraft. Accordingly, a plurality of (in this embodiment, two) actuator control systems 1 are provided for a single control surface 100.

Figure 2:
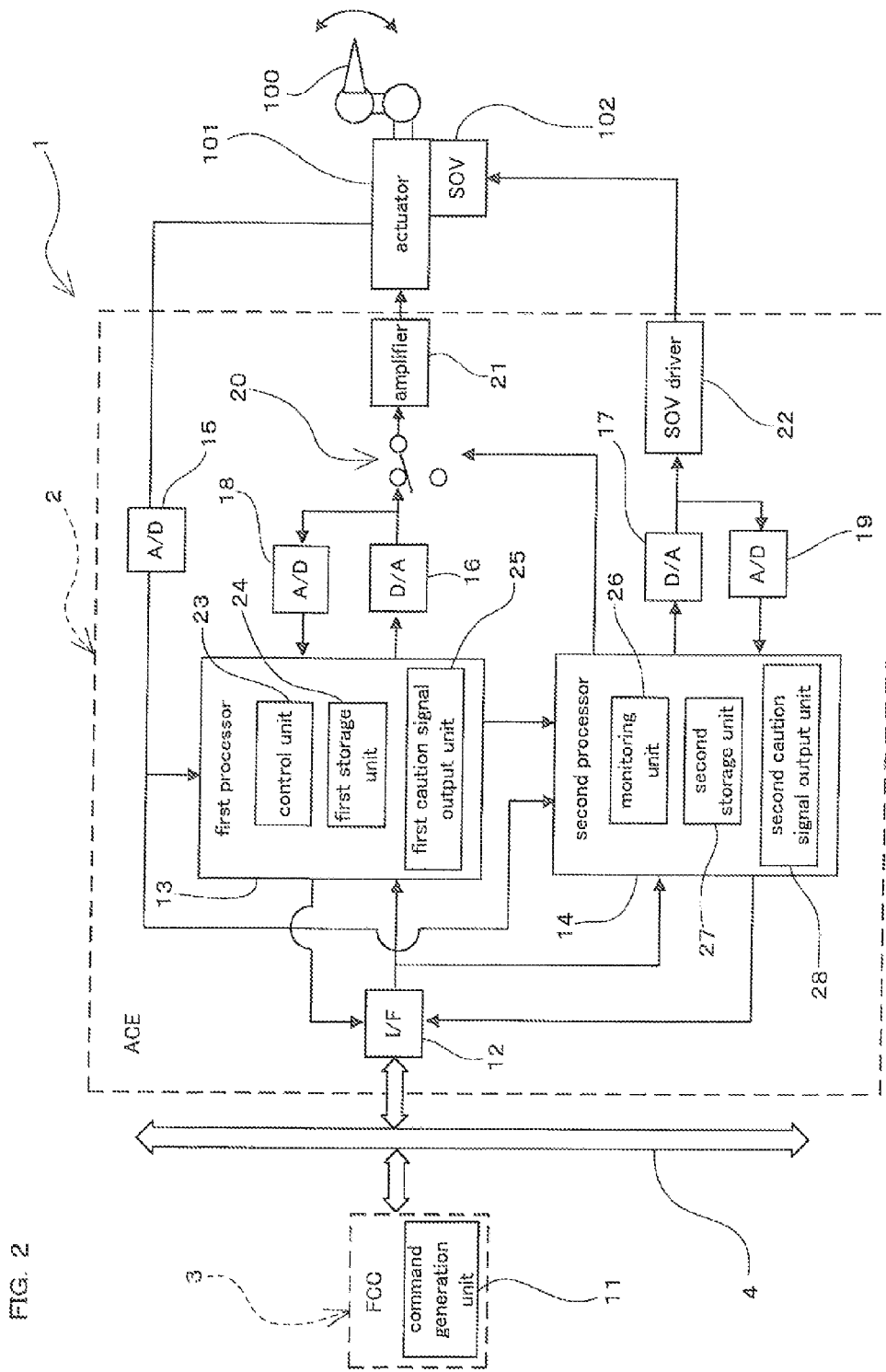
FIG. 2 is a block diagram showing the configuration of the electronic device integrity monitoring apparatus shown in FIG. 1.

FIG. 2 is a block diagram showing the configuration of an ACE 2 of an actuator control system 1. As shown in FIGS. 1 and 2, an actuator control system 1 includes an FCC (Flight Control Computer) 3, an ACE (Actuator Control Electronics) 2, and a digital data bus 4 for communication between the FCC 3 and the ACE 2. Also, the FCC 3 and the ACE 2 are provided corresponding to a single actuator 101.

Note that FIG. 2 shows a block diagram of one of a plurality of actuator control systems 1 provided for a single control surface 100. The block diagram of the other actuator control system 1 is the same as this and therefore has been omitted from FIG. 2. In the following, the FCC 3 and the ACE 2 of one of the actuator control systems 1 are described and the description of the FCC 3 and the ACE 2 of the other actuator control system 1 that are configured in the same manner has been omitted.

The FCC 3 shown in FIG. 2 is provided as a superordinate controller that generates a command signal for commanding the operation of the control surface 100 based on, for example, a manipulation signal generated by the manipulation by a pilot (not shown) and that outputs the command signal to the ACE 2. The operation of the control surface 100 will be controlled based on the command signal from the FCC 3. The FCC 3 is provided with a command generation unit 11 that generates the above-described command signal. Note that the command generation unit 11 is configured, for example, by a CPU (Central Processing Unit), which is not shown, provided in the FCC 3 executing a program stored in a memory (not shown) provided in the FCC 3. Also, the FCC 3 is configured to transmit various signals including the above-described command signal as serial data to the ACE 2 via the digital data bus 4.

Next, the ACE 2 will now be described. The ACE 2 shown in FIG. 2 constitutes the electronic device 2 in this embodiment that controls the actuator 101 based on the command signal from the FCC 3, and also constitutes the integrity monitoring apparatus 2 in this embodiment that monitors the integrity of the electronic device 2. The ACE 2 is installed integrally with the actuator 101, or installed at a place located close to the actuator 101. Also, the ACE 2 is provided with an I/F (interface) 12, a first processor 13, a second processor 14, D/As (digital to analog converting units) 16 and 17, A/Ds (analog to digital converting units) 15, 18 and 19, a relay 20, an amplifier 21, an SOV driver 22, and so forth.

The I/F 12 is configured to allow a signal to be input and output into and from the FCC 3 via the digital data bus 4. The first processor 13 includes a control unit 23, a first storage unit 24, a first caution signal output unit 25, and so forth, and is provided, for example, as a circuit board on which electronic components are mounted.

The control unit 23 is configured as a digital arithmetic unit, and is configured, for example, by an FPGA (Field-Programmable Gate Array), an ASIC (Application Specific Integrated Circuit), or a CPU (Central Processing Unit). The control unit 23 is configured to generate a control signal for controlling the operation of the actuator 101, based on the command signal from the FCC 3 that is input via the I/F 12, a feedback signal that is transmitted from the actuator 101, and sensor signals that are input from various sensors (not shown).

A control signal that has been generated by the control unit 23 is converted from digital data to analog data by the D/A 16. Then, the control signal that has been converted into the analog data by the D/A 16 is input via the relay 20 to the amplifier 21, amplified in the amplifier 21, and then output to the actuator 101.

When no abnormality has been detected by a monitoring unit 26, which will be described below, the relay 20 is in a state of connecting the D/A 16 and the amplifier 21 as shown in FIG. 2. The control signal that has been converted from digital data to analog data by the D/A 16 is converted from analog data to digital data again by the A/D 18, and acquired by the first caution signal output unit 25 described below. Also, the feedback signal from the actuator 101 is converted from analog data to digital data by the A/D 15. The feedback signal is input into the control unit 23 of the first processor 13 and the monitoring unit 26 of the second processor 14.

The first storage unit 24 is provided, for example, as a semiconductor memory, a magnetic memory, or an optical memory, and constitutes, together with a second storage unit 27 of a second processor 14 described below, a storage unit of this embodiment. Also, the first storage unit 24 stores a first reference value serving as a reference value of the voltage value or current value of an input/output electric signal that is input into or output from the control unit 23. Examples of the input/output electric signal that is input into or output from the control unit 23 include the command signal from the FCC 3, the feedback signal from the actuator 101, and a control signal for controlling the operation of the actuator 101.

The above-described first reference value is acquired in a period between completion of production of the control unit 23 and start of operation thereof, and then stored in the first storage unit 24. That is, the first reference value is acquired, as a reference value as an initial state value of the voltage value or current value of an input/output electric signal, in a period between completion of production of a digital arithmetic unit constituting the control unit 23 and start of the operation of the digital arithmetic unit as the control unit 23 of the first processor 13 of the ACE 2 of the actuator control system 1 mounted to an aircraft, and then stored in the first storage unit 24.

As the timing at which the first reference value is acquired and stored in the first storage unit 24, it is possible to select, for example, the timing at which a pre-flight check is performed for the first time since the actuator control system 1 has been mounted to an aircraft. Note that a pre-flight check is a test performed for verifying the operation of various devices when an aircraft being pulled by a trailer moves on a runway before the aircraft takes off, and is performed each time the aircraft takes off. The operation verification for each actuator 101 is also performed in this pre-flight check. Therefore, the control unit 23 generates a control signal for controlling the operation of the actuator 101 also during a pre-flight check, based on, for example, the command signal from the FCC 3 and the feedback signal from the actuator 101.

The first caution signal output unit 25 is configured to compare the input/output electric signal into/from the control unit 23 with the above-described first reference value stored in the first storage unit 24, calculating the amount of deviation therebetween. Furthermore, if the magnitude of the calculated amount of deviation exceeds a predetermined first threshold value that has been set in advance, the first caution signal output unit 25 outputs a first caution signal for signaling that degradation of the control unit 23 has been detected. The first caution signal output unit 25 is configured by a digital arithmetic unit that also serves as the control unit 23. That is, the function of the control unit 23 and the function of the first caution signal output unit 25 are realized by the same digital arithmetic unit. Thus, the control unit 23 and the first caution signal output unit 25 are configured in the same processor 13. Of the input/output electric signals into/from the control unit 23, the control signal that is output from the control unit 23 is acquired by the first caution signal output unit 25 via the A/D 18 as described above.

After a first caution signal is output from the first caution signal output unit 25 as a result of detection of degradation of the control unit 23 as described above, the first caution signal is input into the FCC 3 via the I/F 12 and the digital data bus 4. The FCC 3 that has received input of the first caution signal controls, for example, a display device (not shown) so as to cause the display device to display an alarm message or the like for signaling that degradation of the control unit 23 is occurring. This allows the pilot or the maintenance personnel to be aware of the occurrence of degradation in the control unit 23 of the ACE 2.

The first caution signal output unit 25 acquires an input/output electric signal into/from the control unit 23 under the same conditions as those under which the above-described first reference value has been acquired, and compares the acquired input/output electric signal with the first reference value. Accordingly, if the first reference value has been acquired at the timing of the pre-flight check performed for the first time since the actuator control system 1 had been mounted to the aircraft, then the input/output electric signal that is to be compared with the first reference value is also acquired at the timing of each pre-flight check that is performed before every take-off.

As described above, the first caution signal output unit 25 determines whether the magnitude of the amount of deviation, which is calculated by comparing the first reference value with the input/output electric signal acquired under the same conditions as those under which the first reference value has been acquired, exceeds a predetermined first threshold value, and the first threshold value may be set to a single level, or may be set across a plurality of levels. When the first threshold value is set across a plurality of levels, a plurality of types of the first caution signals respectively corresponding to the plurality of first threshold values are output.

The second processor 14 includes a monitoring unit 26, a second storage unit 27, a second caution signal output unit 28, and so forth, and is provided, for example, as a circuit board on which electronic components are mounted.

The monitoring unit 26 is configured as a digital arithmetic unit, and is configured, for example, by an FPGA (Field-Programmable Gate Array), an ASIC (Application Specific Integrated Circuit), or a CPU (Central Processing Unit). Also, the monitoring unit 26 is configured to monitor the state of the control unit 23 by performing the same calculation as that performed by the control unit 23. Accordingly, the monitoring unit 26 generates a monitoring control signal, which is generated by the same calculation as that performed by the control unit 23 for generating the control signal for controlling the operation of the actuator 101, based on the command signal from the FCC 3 that is input via the I/F 12, a feedback signal that is transmitted from the actuator 101, and sensor signals that are input from various sensors (not shown). Also, the monitoring unit 26 is configured to monitor an abnormality of the control unit 23 by comparing a result of calculation performed by the monitoring unit 26 with a result of calculation performed by the control unit 23. Thereby, the ACE 2 is configured to monitor the occurrence of a generic failure, that is, a failure that may occur commonly among the same pieces of software or hardware.

The above-described monitoring control signal that has been generated by the monitoring unit 26 is converted from digital data to analog data in the D/A 17. Then, the monitoring control signal that has been converted into analog data by the D/A 17 is converted from analog data to digital data again by the A/D 19, and then acquired by a second caution signal output unit 28 described below.

When an abnormality has been detected by the monitoring unit 26, a switching signal for switching the relay 20 is output from the monitoring unit 26. Thereby, the state of the relay 20 is switched from the state shown in FIG. 2 to the state in which connection between the D/A 16 and the amplifier 21 is released and the control signal from the D/A 16 will not be input into the amplifier 21. Accordingly, the control of the actuator 101 based on the control signal generated by the control unit 23 is stopped.

Further, when an abnormality has been detected by the monitoring unit 26, a slave command signal for driving the SOV 102 such that the actuator 101 is slaved to an external load (is slaved to the control surface 100) is output from the monitoring unit 26 to the SOV driver 22 via the D/A 17. Thereby, the SOV driver 22 drives the SOV 102 such that the actuator 101 is slaved to the control surface 100.

The second storage unit 27 is provided, for example, as a semiconductor memory, a magnetic memory, or an optical memory, and constitutes, together with the first storage unit 24 of the first processor 13, a storage unit of this embodiment as described above. Also, the second storage unit 27 stores a second reference value serving as a reference value of the voltage value or current value of an input/output electric signal that is input into or output from the monitoring unit 26. Examples of the input/output electric signal that is input into or output from the monitoring unit 26 include the command signal from the FCC 3, the feedback signal from the actuator 101, and the above-described monitoring control signal.

The above-described second reference value is acquired in a period between completion of production of the monitoring unit 26 and start of operation thereof, and then stored in the second storage unit 27. That is, the second reference value is acquired, as a reference value as an initial state value of the voltage value or current value of an input/output electric signal, in a period between completion of production of a digital arithmetic unit constituting the monitoring unit 26 and start of the operation of the digital arithmetic unit as the monitoring unit 26 of the second processor 14 of the ACE 2 of the actuator control system 1 mounted to an aircraft, and then stored in the second storage unit 27.

As the timing at which the second reference value is acquired and stored in the second storage unit 27, it is possible to select, for example, the timing at which a pre-flight check is performed for the first time since the actuator control system 1 has been mounted to an aircraft. Note that the operation verification for each actuator 101 is also performed in this pre-flight check as described above. Therefore, the monitoring unit 26 generates the above-described monitoring control signal also during a pre-flight check, based on, for example, the command signal from the FCC 3 and the feedback signal from the actuator 101.

The second caution signal output unit 28 is configured to compare the input/output electric signal into/from the monitoring unit 26 with the above-described second reference value stored in the second storage unit 27, calculating the amount of deviation therebetween. Furthermore, if the magnitude of the calculated amount of deviation exceeds a predetermined second threshold value that has been set in advance, the second caution signal output unit 28 outputs a second caution signal for signaling that degradation of the monitoring unit 26 has been detected. The second caution signal output unit 28 is configured by a digital arithmetic unit that also serves as the monitoring unit 26. That is, the function of the monitoring unit 26 and the function of the second caution signal output unit 28 are realized by the same digital arithmetic unit. Thus, the monitoring unit 26 and the second caution signal output unit 28 are configured in the same processor 14. Of the input/output electric signals into/from the monitoring unit 26, the monitoring control signal that is output from the monitoring unit 26 is acquired by the second caution signal output unit 28 via the A/D 19 as described above.

After a second caution signal is output from the second caution signal output unit 28 as a result of detection of degradation of the monitoring unit 26 as described above, the second caution signal is input into the FCC 3 via the I/F 12 and the digital data bus 4. The FCC 3 that has received input of the second caution signal controls, for example, a display device (not shown) so as to cause the display device to display an alarm message or the like for signaling that degradation of the monitoring unit 26 is occurring. This allows the pilot or the maintenance personnel to be aware of the occurrence of degradation in the monitoring unit 26 of the ACE 2.

The second caution signal output unit 28 acquires an input/output electric signal into/from the monitoring unit 26 under which the above-described second reference value has been acquired, and compares the acquired input/output electric signal with the second reference value. Accordingly, if the second reference value has been acquired at the timing of the pre-flight check performed for the first time since the actuator control system 1 had been mounted to the aircraft, then the input/output electric signal that is to be compared with the second reference value is also acquired at the timing of each pre-flight check that is performed before every take-off.

As described above, the second caution signal output unit 28 determines whether the magnitude of the amount of deviation, which is calculated by comparing the second reference value with the input/output electric signal acquired under the same conditions as those under which the second reference value has been acquired, exceeds a predetermined second threshold value, and the second threshold value may be set to a single level, or may be set across a plurality of levels. When the second threshold value is set across a plurality of levels, a plurality of types of the second caution signals respectively corresponding to the plurality of second threshold values are output.

Next is a description of the operation of the ACE 2, which is provided as the electronic device 2 and the integrity monitoring apparatus 2. In a normal operation in which no abnormality is detected by the monitoring unit 26 of the ACE 2, the control unit 23 of the first processor 13 of the ACE 2 controls the operation of the actuator 101 by generating a control signal based on a command signal from the FCC 3. Consequently, the operation of the control surface 100 driven the actuator 101 is controlled.

On the other hand, when an abnormality has been detected by the monitoring unit 26 of the ACE 2, a switching signal is output from the monitoring unit 26, and thereby the state of the relay 20 is switched to a state in which the D/A 16 and the amplifier 21 are disconnected. Consequently, the control of the actuator 101 based on the control signal generated by the control unit 23 is stopped. Further, the slave command signal is output from the monitoring unit 26 to the SOV driver 22, thus starting the control by the SOV driver 22 that drives the SOV 102 such that the actuator 101 is slaved to the control surface 100.

At the timing at which the same conditions as those under which the first reference value has been acquired are met (for example, at the timing of a pre-flight check), an input/output electric signal into/from the control unit 23 is acquired by the first caution signal output unit 25. Then, the amount of deviation between the acquired input/output electric signal and the first reference value is calculated, and the first caution signal for signaling that degradation of the control unit 23 has been detected is output from the first caution signal output unit 25 to the FCC 3 via the I/F 12 and the digital data bus 4 only if the amount of deviation exceeds the predetermined first threshold value.

At the timing at which the same conditions as those under which the second reference value has been acquired are met (for example, at the timing of a pre-flight check), an input/output electric signal into/from the monitoring unit 26 is acquired by the second caution signal output unit 28. Also, the amount of deviation between the acquired input/output electric signal and the second reference value is calculated, and the second reference value for signaling that degradation of the monitoring unit 26 has been detected is output from the second caution signal output unit 28 to the FCC 3 via the I/F 12 and the digital data bus 4 only if the amount of deviation exceeds the predetermined second threshold value.

As described above, with the integrity monitoring apparatus 2, an abnormality relating to the operation of the electronic device 2 with regard to the processing performed by the control unit 23 is monitored by the monitoring unit 26, and therefore a configuration that monitors a generic failure can be achieved. As for the control unit 23, the first caution signal output unit 25 calculates the amount of deviation between the first reference value, which is the reference value of the input/output electric signal acquired and stored in a period between completion of production of the control unit 23 and start of operation thereof, and the input/output electric signal acquired under the same conditions as those used for acquisition of the first reference value. As the degradation of the performance of the control unit 23 from the initial state progresses, the amount of deviation increases. Furthermore, if the above-described amount of deviation exceeds a predetermined threshold value (first threshold value), or in other words, if the degree of degradation progresses to a degree greater than a predetermined degree, the first caution signal output unit 25 detects degradation and outputs a caution signal (first caution signal). Accordingly, with the integrity monitoring apparatus 2, the degree of degradation of the control unit 23 is detected, or in other words, the susceptibility to a failure of the control unit 23 is determined quantitatively and then signaled.

As for the monitoring unit 26, the second caution signal output unit 28 calculates the amount of deviation between the second reference value, which is the reference value of the input/output electric signal acquired and stored in a period between completion of production of the monitoring unit 26 and start of operation thereof, and the input/output electric signal acquired under the same conditions as those used for acquisition of the second reference value. As the degradation of the performance of the monitoring unit 26 from the initial state progresses, the amount of deviation increases. Furthermore, if the above-described amount of deviation exceeds a predetermined threshold value (second threshold value), or in other words, if the degree of degradation progresses to a degree greater than a predetermined degree, the second caution signal output unit 28 detects degradation and outputs a caution signal (second caution signal). Accordingly, with the integrity monitoring apparatus 2, the degree of degradation of the monitoring unit 26 is detected, or in other words, the susceptibility to a failure of the monitoring unit 26 is determined quantitatively and then signaled.

As described above, with the integrity monitoring apparatus 2, the degree of degradation of each of the control unit 23 and the monitoring unit 26 is detected, and it is possible to perform maintenance such as replacement of the device and components at an appropriate timing before a failure occurs in the control unit 23 or the monitoring unit 26. Accordingly, it is possible to suppress the occurrence of a failure of the electronic device 2 from impeding efficient operation of the actuator 101 to which a control signal is output from the electronic device 2. Thus, the integrity monitoring apparatus 2 can monitor the integrity of the electronic device 2 that outputs a control signal to the operating device (actuator 101) whose operation is to be controlled.

Therefore, according to this embodiment, it is possible to provide an electronic device integrity monitoring apparatus 2 capable of monitoring the integrity of the electronic device 2 that outputs a control signal to an operating device whose operation is to be controlled, monitoring a generic failure by being provided with the control unit 23 and the monitoring unit 26, and even detecting the degree of degradation of the control unit 23 and the monitoring unit 26.

According to this embodiment, it is also possible to configure an integrity monitoring apparatus 2 in which each of the first and the second threshold values is set across a plurality of levels and a plurality of types of the first and second caution signals respectively corresponding to the levels are output. With the integrity monitoring apparatus 2, the degree of degradation of each of the control unit 23 and the monitoring unit 26 is detected in a step-wise manner across a plurality of stages and then signaled. Accordingly, it is possible to take different countermeasures in a step-wise manner during maintenance, depending on the level of the caution signal, thus taking more appropriate countermeasures in a step-wise manner according to the status of degradation.

With the integrity monitoring apparatus 2, the control unit 23 and the first caution signal output unit 25 are configured in the same processor, and the monitoring unit 26 and the second caution signal output unit 28 are configured in the same processor. Accordingly, the first processor 13 that realizes the function of the control unit 23 can be effectively used to handle the function of the first caution signal output unit 25 as well, and the second processor 14 that realizes the function of the monitoring unit 26 can be effectively used to handle the function of the second caution signal output unit 28 as well. This can realize simplification and streamlining of the overall configuration of the integrity monitoring apparatus 2.

Second Embodiment

Figure 3:
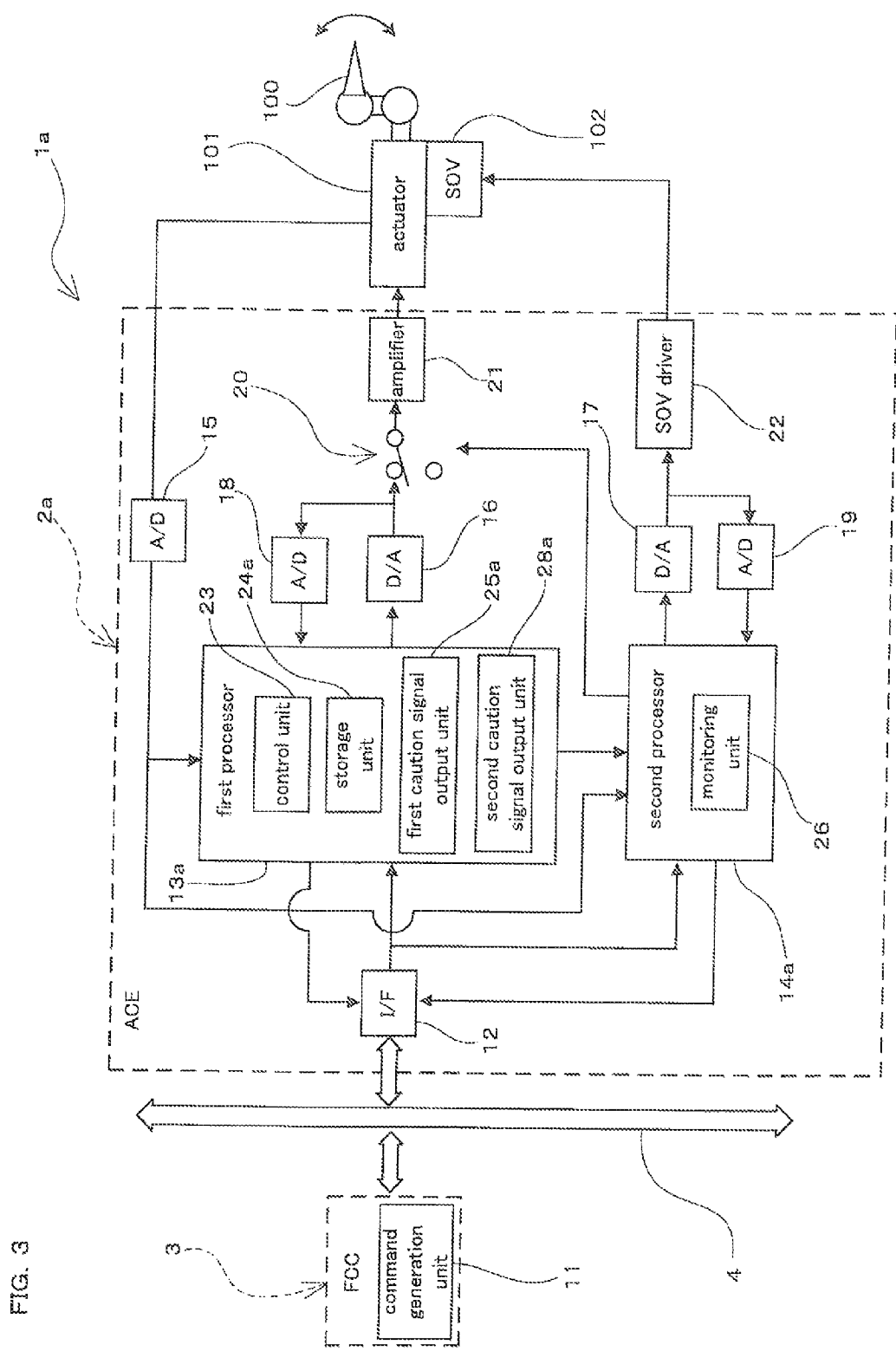
FIG. 3 is a block diagram showing the configuration of an electronic device integrity monitoring apparatus according to a second embodiment of the present invention.

Next is a description of an electronic device integrity monitoring apparatus 2a according to a second embodiment of the present invention. FIG. 3 is a block diagram showing an actuator control system 1a including an integrity monitoring apparatus 2a in this embodiment, showing the configuration of the integrity monitoring apparatus 2a.

As with the actuator control system 1 of the first embodiment, the actuator control system 1a is mounted to an aircraft (not shown), and is provided as a flight control system serving as an FBW (Fly By Wire) system that controls the operation of a control surface 100 of the aircraft via electric signals. Also, the actuator control system 1a includes an FCC (Flight Control Computer) 3, an ACE (Actuator Control Electronics)

2a, a digital data bus 4 for communication between the FCC 3 and ACE 2a. Also, the FCC 3 and the ACE 2a are provided corresponding to a single actuator 101.

In this embodiment, the ACE 2a constitutes an electronic device of this embodiment that outputs a control signal to the actuator 101 serving as an operating device whose operation is to be controlled. Also, the ACE 2a is provided with the function for monitoring the integrity of the ACE 2a serving as the electronic device in this embodiment. That is, the ACE 2a also constitutes the electronic device integrity monitoring apparatus 2a in this embodiment. In the following description, the ACE 2a is also referred to as an "electronic device 2a" or an "integrity monitoring apparatus 2a". Also, in the following, the configurations different from those of the first embodiment are described, and the description of elements configured in the same manner as in the first embodiment is omitted by using the same reference numerals in the drawings.

As shown in FIG. 3, the ACE 2a is provided with an I/F (interface) 12, a first processor 13a, a second processor 14a, D/As (digital to analog converting units) 16 and 17, A/Ds (analog to digital converting units) 15, 18 and 19, a relay 20, an amplifier 21, an SOV driver 22, and so forth.

The first processor 13a of the ACE 2a includes a control unit 23, a storage unit 24a, a first caution signal output unit 25a, a second caution signal output unit 28a, and so forth, and is provided, for example, as a circuit board on which electronic components are mounted. The second processor 14a of the ACE 2a includes a monitoring unit 26 and so forth, and is provided, for example, as a circuit board on which electronic components are mounted.

The control unit 23 is configured as a digital arithmetic unit, and is configured, for example, by an FPGA (Field-Programmable Gate Array), an ASIC (Application Specific Integrated Circuit), or a CPU (Central Processing Unit). The control unit 23 of the first processor 13a is configured in the same manner as the control unit 23 of the first processor 13 of the first embodiment, and is configured to generate a control signal for controlling the operation of the actuator 101, based on, for example, the command signal from the FCC 3 and the feedback signal from the actuator 101.

The monitoring unit 26 is configured as a digital arithmetic unit, and is configured, for example, by an FPGA (Field-Programmable Gate Array), an ASIC (Application Specific Integrated Circuit), or a CPU (Central Processing Unit). Also, the monitoring unit 26 of the second processor 14a is configured in the same manner as the second processor 14 of the first embodiment, and is configured to monitor the state of the control unit 23 by performing the same calculation as that performed by the control unit 23.

The storage unit 24a is provided, for example, as a semiconductor memory, a magnetic memory, or an optical memory, and constitutes a storage unit of this embodiment. That is, unlike the ACE 2 of the first embodiment, only the first processor 13a is provided with the storage unit of this embodiment in the ACE 2a. Also, the storage unit 24a stores a first reference value serving as a reference value of the voltage value or current value of an input/output electric signal that is input into or output from the control unit 23 and a second reference value serving as a reference value of the voltage value or current value of an input/output electric signal that is input into or output from the monitoring unit 26.

Note that the input/output electric signal into/from the control unit 23, the input/output electric signal into/from the monitoring unit 26, the first reference value, and the second reference value are configured in the same manner as the corresponding ones in the first embodiment. Also, as with the first embodiment, the first reference value and the second reference value are acquired and stored in the storage unit 24a in a period between completion of production of the control unit 23 and the monitoring unit 26 and start of operation thereof. For example, as the timing at which the first reference value and the second reference value are acquired and stored in the storage unit 24a, it is possible to select the timing at which a pre-flight check is performed for the first time since the actuator control system 1a has been mounted to an aircraft.

The first caution signal output unit 25a is configured in the same manner as the first caution signal output unit 25 of the first embodiment. That is, the first caution signal output unit 25a is configured to compare the input/output electric signal into/from the control unit 23 with the first reference value stored in the storage unit 24a, calculating the amount of deviation therebetween, and to output, if the magnitude of the calculated amount of deviation exceeds a predetermined first threshold value, a first caution signal for signaling that degradation of the control unit 23 has been detected. Also, the first caution signal output unit 25a is configured to acquire an input/output electric signal into/from the control unit 23 under the same conditions as those under which the first reference value has been acquired.

The second caution signal output unit 28a is configured in the same manner as the second caution signal output unit 28 of the first embodiment. That is, the second caution signal output unit 28a is configured to compare the input/output electric signal into/from the monitoring unit 26 with the second reference value stored in the storage unit 24a, calculating the amount of deviation therebetween, and to output, if the magnitude of the calculated amount of deviation exceeds a predetermined second threshold value, a second caution signal for signaling that degradation of the monitoring unit 26 has been detected. Also, the second caution signal output unit 28a is configured to acquire an input/output electric signal into/from the monitoring unit 26 under the same conditions as those under which the second reference value has been acquired.

However, unlike the ACE 2 of the first embodiment, the first caution signal output unit 25a and the second caution signal output unit 28a of the ACE 2a are configured by the digital arithmetic unit that functions as the control unit 23 as well. That is, the function of the control unit 23, the function of the first caution signal output unit 25a, and the function of the second caution signal output unit 28a are realized by the same digital arithmetic unit. Thus, the first caution signal output unit 25a, the second caution signal output unit 28a, and the control unit 23 of the ACE 2a are configured in the same processor 13a.

The integrity monitoring apparatus 2a described thus far can operate in the same manner as the integrity monitoring apparatus 2 of the first embodiment, and can achieve the same effects. That is, according to this embodiment, it is possible to provide an electronic device integrity monitoring apparatus 2a capable of monitoring the integrity of the electronic device 2a that outputs a control signal to an operating device whose operation is to be controlled, monitoring a generic failure by being provided with the control unit 23 and the monitoring unit 26, and even detecting the degree of degradation of the control unit 23 and the monitoring unit 26.

With the integrity monitoring apparatus 2a, the first caution signal output unit 25a, the second caution signal output unit 28a, and the control unit 23 are configured in the same processor 13a. Accordingly, the processor 13a that realizes the function of the control unit 23 can be effectively used to handle the functions of the first caution signal output unit 25a and the second caution signal output unit 28a as well.

This can realize simplification and streamlining of the overall configuration of the integrity monitoring apparatus 2a.

Third Embodiment

Figure 4:
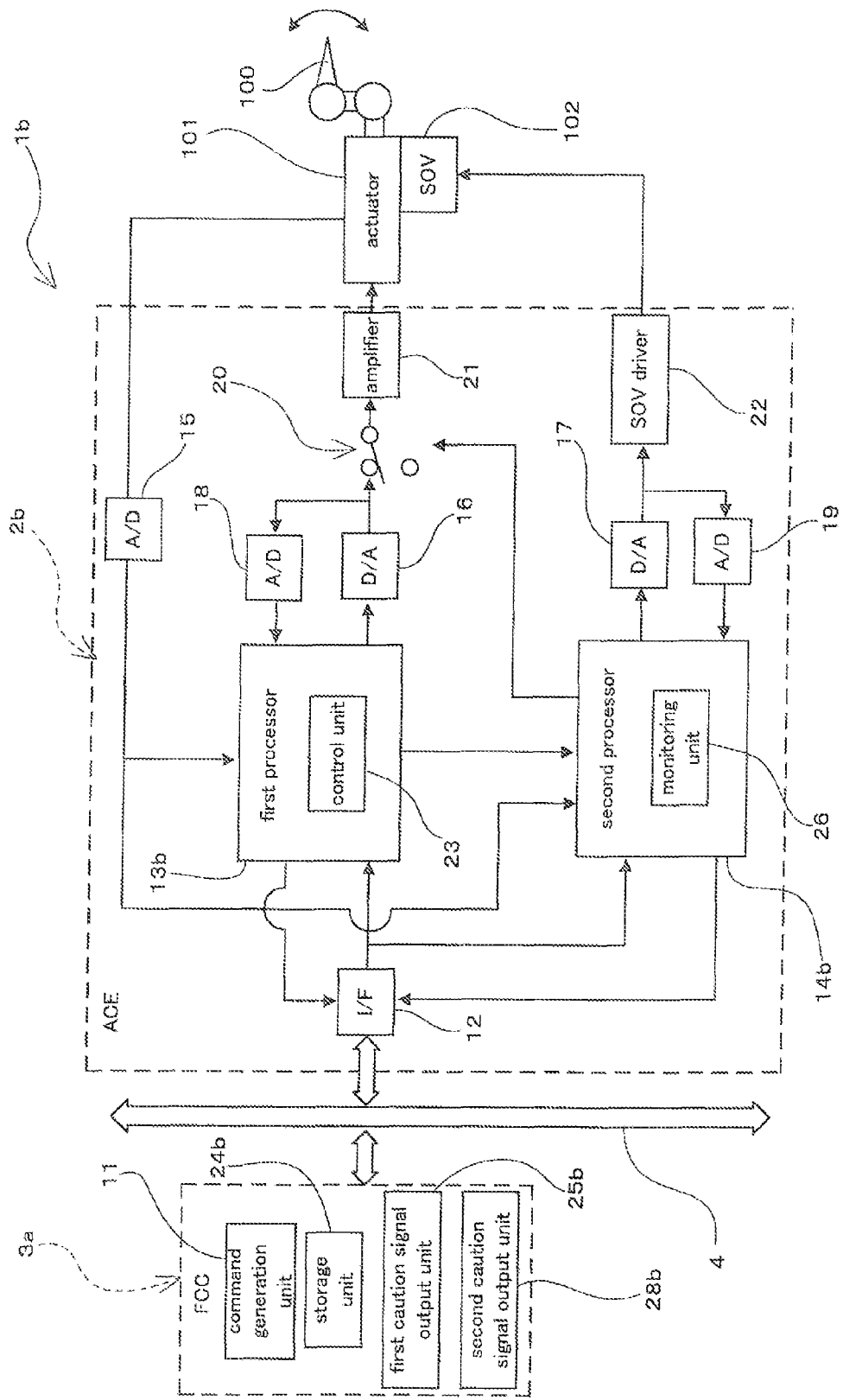
FIG. 4 is a block diagram showing the configuration of an electronic device integrity monitoring apparatus according to a third embodiment of the present invention.

Next is a description of an electronic device integrity monitoring apparatus 1b according to a third embodiment of the present invention. FIG. 4 is a block diagram showing an actuator control apparatus 1b constituting the integrity monitoring apparatus 1b in this embodiment.

As with the actuator control system 1 of the first embodiment, the actuator control apparatus 1b shown in FIG. 4 is mounted to an aircraft (not shown), and is provided as a flight control apparatus or flight control system serving as an FBW (Fly By Wire) system that controls the operation of a control surface 100 of the aircraft via electric signals. The actuator control apparatus 1b includes an FCC (Flight Control Computer) 3a, an ACE (Actuator Control Electronics) 2b, and a digital data bus 4 for communication between the FCC 3a and the ACE 2b. The FCC 3a and the ACE 2b are provided corresponding to a single actuator 101.

In this embodiment, the ACE 2b constitutes an electronic device of this embodiment that outputs a control signal to the actuator 101 serving as an operating device whose operation is to be controlled. Also, in this embodiment, the actuator control apparatus 1b including the ACE 2b and the FCC 3a constitutes an electronic device integrity monitoring apparatus 1b of this embodiment that is provided with the function for monitoring the integrity of the ACE 2a serving as the electronic device. In the following description, the ACE 2b is also referred to as an "electronic device 2b", and the actuator control apparatus 1b is also referred to as an "integrity monitoring apparatus 1b". Also, in the following, the configurations different from those of the first embodiment are described, and the description of elements configured in the same manner as in the first embodiment is omitted by using the same reference numerals in the drawings.

As shown in FIG. 4, the ACE 2b is provided with an I/F (interface) 12, a first processor 13b, a second processor 14b, D/As (digital to analog converting units) 16 and 17, A/Ds (analog to digital converting units) 15, 18 and 19, a relay 20, an amplifier 21, an SOV driver 22, and so forth.

The first processor 13b of the ACE 2b includes a control unit 23 and so forth, and is provided, for example, as a circuit board on which electronic components are mounted. The second processor 14b of the ACE 2b includes a monitoring unit 26 and so forth, and is provided, for example, as a circuit board on which electronic components are mounted.

The control unit 23 is configured as a digital arithmetic unit, and is configured, for example, by an FPGA (Field-Programmable Gate Array), an ASIC (Application Specific Integrated Circuit), or a CPU (Central Processing Unit). The control unit 23 of the first processor 13b is configured in the same manner as the control unit 23 of the first processor 13 of the first embodiment, and is configured to generate a control signal for controlling the operation of the actuator 101, based on, for example, the command signal from the FCC 3 and the feedback signal from the actuator 101.

The monitoring unit 26 is configured as a digital arithmetic unit, and is configured, for example, by an FPGA (Field-Programmable Gate Array), an ASIC (Application Specific Integrated Circuit), or a CPU (Central Processing Unit). Also, the monitoring unit 26 of the second processor 14b is configured in the same manner as the monitoring unit 26 of the second processor 14 of the first embodiment, and is configured to monitor the state of the control unit 23 by performing the same calculation as that performed by the control unit 23.

The FCC 3a shown in FIG. 4 is provided as a superordinate controller that generates a command signal for commanding the operation of the control surface 100 based on, for example, a manipulation signal generated by the manipulation by a pilot (not shown) and that outputs the command signal to the ACE 2b (in the following description, the FCC 3a is also referred to as the "controller 3a"). The operation of the control surface 100 will be controlled based on the command signal from the FCC 3a.

The FCC 3a is provided with a command generation unit 11, a storage unit 24b, a first caution signal output unit 25b, a second caution signal output unit 28b, and so forth. As with the FCC 3 of the first embodiment, the FCC 3a 3 is configured to transmit various signals including the above-described command signal as serial data to the ACE 2b via the digital data bus 4.

The command generation unit 11 is configured as a digital arithmetic unit, and is configured, for example, by an FPGA (Field-Programmable Gate Array), an ASIC (Application Specific Integrated Circuit), or a CPU (Central Processing Unit). As with the command generation unit 11 of the FCC 3 of the first embodiment, the command generation unit 11 of the FCC 3a is configured to generate the above-described command signal based on, for example, a manipulation signal generated by the manipulation by the pilot.

The storage unit 24b is provided, for example, as a semiconductor memory, a magnetic memory, or an optical memory, and constitutes a storage unit of this embodiment. That is, unlike the actuator control system 1 of the first embodiment, the FCC 3a is provided with the storage unit of this embodiment in the actuator control apparatus 1b. Also, the storage unit 24b stores a first reference value serving as a reference value of the voltage value or current value of an input/output electric signal that is input into or output from the control unit 23 of the ACE 2b and a second reference value serving as a reference value of the voltage value or current value of an input/output electric signal that is input into or output from the monitoring unit 26 of the ACE 2b.

Note that the input/output electric signal into/from the control unit 23, the input/output electric signal into/from the monitoring unit 26, the first reference value, and the second reference value are configured in the same manner as the corresponding ones in the first embodiment. Also, as with the first embodiment, the first reference value and the second reference value are acquired and stored in the storage unit 24b in a period between completion of production of the control unit 23 and the monitoring unit 26 and start of operation thereof. For example, as the timing at which the first reference value and the second reference value are acquired and stored in the storage unit 24b, it is possible to select the timing at which a pre-flight check is performed for the first time since the actuator control apparatus 1b has been mounted to an aircraft.

The first caution signal output unit 25b is configured in the same manner as the first caution signal output unit 25 of the first embodiment. That is, the first caution signal output unit 25b is configured to compare the input/output electric signal into/from the control unit 23 with the first reference value stored in the storage unit 24b, calculating the amount of deviation therebetween, and to output, if the magnitude of the calculated amount of deviation exceeds a predetermined first threshold value, a first caution signal for signaling that degradation of the control unit 23 has been detected. Also, the first caution signal output unit 25b is configured to acquire an input/output electric signal into/from the control unit 23 under the same conditions as those under which the first reference value has been acquired. Note that the input/output electric signal into/from the control unit 23 is acquired by the first caution signal output unit 25b via the I/F 12 and the digital data bus 4.

The second caution signal output unit 28b is configured in the same manner as the second caution signal output unit 28 of the first embodiment. That is, the second caution signal output unit 28b is configured to compare the input/output electric signal into/from the monitoring unit 26 with the second reference value stored in the storage unit 24b, calculating the amount of deviation therebetween, and to output, if the magnitude of the calculated amount of deviation exceeds a predetermined second threshold value, a second caution signal for signaling that degradation of the monitoring unit 26 has been detected. Also, the second caution signal output unit 28b is configured to acquire an input/output electric signal into/from the monitoring unit 26 under the same conditions as those under which the second reference value has been acquired. Note that the input/output electric signal into/from the monitoring unit 26 is acquired by the second caution signal output unit 28b via the I/F 12 and the digital data bus 4.

However, unlike the actuator control system 1 of the first embodiment, the first caution signal output unit 25b and the second caution signal output unit 28b of the actuator control apparatus 1b are configured by the digital arithmetic unit that functions as the command generation unit 11 as well. That is, the function of the command generation unit 11, the function of the first caution signal output unit 25b, and the function of the second caution signal output unit 28b are realized by the same digital arithmetic unit. Also, unlike the actuator control system 1 of the first embodiment, the FCC 3a is provided with the storage unit 24b in the actuator control apparatus 1b. Thus, the FCC 3a is provided with the storage unit 24b, the first caution signal output unit 25b, and the second caution signal output unit 28b in the actuator control apparatus 1b.

The integrity monitoring apparatus 1b described thus far can operate in the same manner as the integrity monitoring apparatus 2 of the first embodiment, and can achieve the same effects. That is, according to this embodiment, it is possible to provide an electronic device integrity monitoring apparatus 1b capable of monitoring the integrity of the electronic device 2b that outputs a control signal to an operating device whose operation is to be controlled, monitoring a generic failure by being provided with the control unit 23 and the monitoring unit 26, and even detecting the degree of degradation of the control unit 23 and the monitoring unit 26.

With the integrity monitoring apparatus 1b, the superordinate controller 3a, which outputs a command signal to the electronic device 2b with which the control unit 23 and the monitoring unit 26 are provided, is provided with the storage unit 24b, the first caution signal output unit 25b, and the second caution signal output unit 28b. Accordingly, the superordinate controller 3a can be effectively used to handle the function of the storage unit 24b, the function of the first caution signal output unit 25b, and the function of the second caution signal output unit 28b. This can realize simplification and streamlining of the overall configuration of the integrity monitoring apparatus 2 that includes the electronic device 2b and the superordinate controller 3a.

Although embodiments of the present invention have been described thus far, the present invention is not limited to the above-described embodiments, and various modifications may be made within the scope recited in the claims. For example, the following modifications are possible.

(1) Although the first to third embodiments have been each described taking, as an example, a case where the operating device whose operation is to be controlled to which the integrity monitoring apparatus is applied is an actuator for driving a control surface of an aircraft, the integrity monitoring apparatus is not limited to this example and may be applied to various operating devices. For example, the integrity monitoring apparatus of the present invention may be used as an integrity monitoring apparatus for monitoring the integrity of an electronic device that controls a leg of an aircraft (a mechanism supporting the body of an aircraft on the ground) such as a landing gear (undercarriage), an air conditioner installed in an aircraft, an engine of an aircraft, or the like. Furthermore, applications of the integrity monitoring apparatus are not limited to aircraft applications. For example, the integrity monitoring apparatus of the present invention may be used as an integrity monitoring apparatus for monitoring the integrity of an electronic device that controls a gas turbine engine or the like that is widely used for power generation.

(2) Although the second embodiment has been described taking, as an example, a configuration in which the first caution signal output unit, the second caution signal output unit, and the control unit are configured in the same processor and the monitoring unit is configured in another processor, this need not be the case. It is possible to implement an integrity monitoring apparatus in which the first caution signal output unit, the second caution signal output unit, and the monitoring unit are configured in the same processor and the control unit is configured in another processor.

(3) Although the first to third embodiments have been each described taking, as an example, the timing at which a preflight check is performed as the timing at which the first and second reference values stored in the storage unit are acquired, this need not be the case. The timing at which the first and second reference values are acquired may be any timing in a period between completion of production of the control unit and the monitoring unit and start of operation thereof.

The present invention is widely applicable as an electronic device integrity monitoring apparatus for monitoring the integrity of an electronic device that outputs a control signal to an operating device whose operation is to be controlled. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. An electronic device integrity monitoring apparatus for monitoring the integrity of an electronic device that outputs a control signal to an operating device whose operation is to be controlled, the apparatus comprising:

a control unit with which the electronic device is provided and that generates the control signal for controlling operation of the operating device;

a monitoring unit with which the electronic device is provided and that monitors a state of the control unit by performing the same calculation as that performed by the control unit;

a storage unit that stores a first reference value serving as a reference value of a voltage value or a current value of an input/output electric signal that is input into or output from the control unit and a second reference value serving as a reference value of a voltage value or a current value of an input/output electric signal that is input into or output from the monitoring unit;

a first caution signal output unit that compares the input/output electric signal into/from the control unit with the first reference value stored in the storage unit, calculating an amount of deviation therebetween, and that outputs, if the amount of deviation exceeds a predetermined first threshold value, a first caution signal for signaling that degradation of the control unit has been detected; and a second caution signal output unit that compares the input/output electric signal into/from the monitoring unit with the second reference value stored in the storage unit, calculating an amount of deviation therebetween, and that outputs, if the amount of deviation exceeds a predetermined second threshold value, a second caution signal for signaling that degradation of the monitoring unit has been detected, wherein the first reference value and the second reference value are acquired and stored in the storage unit in a period between completion of production of the control unit and the monitoring unit and start of operation thereof, and the first caution signal output unit and the second caution signal output unit acquire the input/output electric signals into/from the control unit and the monitoring unit, respectively, under the same conditions as those under which the first reference value and the second reference value are acquired.

2. The electronic device integrity monitoring apparatus according to claim 1, wherein each of the first threshold value and the second threshold value is set across a plurality of levels, a plurality of types of the first caution signals respectively corresponding to the plurality of first threshold values are output, and a plurality of types of the second caution signals respectively corresponding to the plurality of second threshold values are output.

3. The electronic device integrity monitoring apparatus according to claim 1, wherein the control unit and the first caution signal output unit are configured in the same processor, and the monitoring unit and the second caution signal output unit are configured in the same processor.

4. The electronic device integrity monitoring apparatus according to claim 1, wherein the first caution signal output unit, the second caution signal output unit, and at least one of the control unit and the monitoring unit are configured in the same processor.

5. The electronic device integrity monitoring apparatus according to claim 1, further comprising a superordinate controller that outputs a command signal to the electronic device that is provided with the control unit and the monitoring unit, wherein the controller is provided with the storage unit, the first caution signal output unit, and the second caution signal output unit.

* * * * *